United States Patent
Chen et al.

(10) Patent No.: US 10,244,518 B2
(45) Date of Patent: Mar. 26, 2019

(54) DYNAMIC INDICATION OF TIME DIVISION (TDD) DUPLEX UPLINK/DOWNLINK SUBFRAME CONFIGURATIONS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Neng Wang, Beijing (CN); Chao Wei, Beijing (CN); Minghai Feng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 14/905,929

(22) PCT Filed: Jul. 14, 2014

(86) PCT No.: PCT/CN2014/082118
§ 371 (c)(1),
(2) Date: Jan. 18, 2016

(87) PCT Pub. No.: WO2015/014207
PCT Pub. Date: Feb. 5, 2015

(65) Prior Publication Data
US 2016/0165578 A1     Jun. 9, 2016

(30) Foreign Application Priority Data

Jul. 29, 2013  (WO) ................ PCT/CN2013/080330
Aug. 9, 2013   (WO) ................ PCT/CN2013/081188

(51) Int. Cl.
*H04L 5/00*   (2006.01)
*H04W 72/04*  (2009.01)
(Continued)

(52) U.S. Cl.
CPC ......... *H04W 72/042* (2013.01); *H04L 5/0037* (2013.01); *H04L 5/0053* (2013.01);
(Continued)

(58) Field of Classification Search
CPC ... H04L 5/0037; H04L 5/0053; H04L 5/0091; H04L 5/1469; H04W 72/042; H04W 76/048
See application file for complete search history.

(56) References Cited

U.S. PATENT DOCUMENTS

2011/0235599 A1  9/2011  Nam et al.
2013/0044651 A1  2/2013  Wang et al.
(Continued)

FOREIGN PATENT DOCUMENTS

CN   102594438 A   7/2012
CN   102845012 A   12/2012
(Continued)

OTHER PUBLICATIONS

International Search Report and Written Opinion—PCT/CN2013/080330—ISA/EPO—dated May 12, 2014.
(Continued)

*Primary Examiner* — Mohamed A Kamara
*Assistant Examiner* — Ryan C Kavleski
(74) *Attorney, Agent, or Firm* — Patterson & Sheridan, LLP

(57) ABSTRACT

Aspects of the present disclosure relate to techniques for dynamic indication of Time Division Duplex (TDD) Uplink (UL)/Downlink (DL) subframe configuration to User Equipments. A base station may identify one or more anchor subframes and one or more non-anchor subframes in a frame. The base station may dynamically change a UL/DL configuration of the frame used for communicating with a plurality of User Equipments (UEs) and signal the changed
(Continued)

configuration using a common downlink control channel capable of being interpreted by the plurality of UEs in at least one of the one or more anchor subframes of the frame.

28 Claims, 12 Drawing Sheets

(51) Int. Cl.
*H04W 76/28* (2018.01)
*H04L 5/14* (2006.01)

(52) U.S. Cl.
CPC .......... *H04L 5/0091* (2013.01); *H04L 5/1469* (2013.01); *H04W 76/28* (2018.02)

(56) References Cited

U.S. PATENT DOCUMENTS

| | | |
|---|---|---|
| 2013/0044652 A1 | 2/2013 | Wang et al. |
| 2013/0188516 A1 | 7/2013 | He et al. |
| 2013/0272170 A1* | 10/2013 | Chatterjee ............. H04W 28/02 370/280 |
| 2013/0294268 A1 | 11/2013 | Xu et al. |
| 2013/0336177 A1 | 12/2013 | Gao et al. |
| 2014/0269452 A1* | 9/2014 | Papasakellariou ... H04B 7/2643 370/280 |
| 2015/0110010 A1* | 4/2015 | Wei ....................... H04L 5/0098 370/329 |
| 2015/0270933 A1* | 9/2015 | Feng .................... H04B 7/2656 370/280 |
| 2017/0181145 A1* | 6/2017 | Fong ................... H04W 72/042 |

FOREIGN PATENT DOCUMENTS

| | | |
|---|---|---|
| CN | 103023614 A | 4/2013 |
| RU | 2469498 C2 | 12/2012 |
| WO | WO-2012148222 A2 | 11/2012 |
| WO | WO-2012177037 A2 | 12/2012 |
| WO | WO-2013155373 A1 | 10/2013 |
| WO | WO-2014049169 A1 | 4/2014 |

OTHER PUBLICATIONS

International Search Report and Written Opinion—PCT/CN2013/081188—ISA/EPO—dated May 6, 2014.
International Search Report and Written Opinion—PCT/CN2014/082118—ISA/EPO—dated Oct. 21, 2014.
HTC: "Methods to Support TDD UL-DL Traffic Adaptation", 3GPP Draft, R1-131205, Methods to Support TDD UL-DL Traffic Adaptation, 3rd Generation Partnership Project (3GPP), Mobile Competence Centre, 650, Route Des Lucioles, F-06921, Sophia-Antipolis CEDEX, vol. RAN WG1, No. Chicago, USA, 20130415-20130419, Apr. 6, 2013 (Apr. 6, 2013), XP050697117, Retrieved from the Internet: URL:http://www.3gpp.orgjftpjtsgranjWG1RL1/TSGR172b/Docs/.
Huawei., et al., "Signaling Mechanisms for TDD eIMTA", 3GPP Draft, R1-130883, 3rd Generation Partnership Project (3GPP), Mobile Competence Centre, 650, Route Des Lucioles, F-06921, Sophia-Antipolis CEDEX, France, vol. RAN WG1, No. Chicago, USA, 20130415-20130419, Apr. 6, 2013 (Apr. 6, 2013), XP050696884, Retrieved from the Internet: URL:http://www.3gpp.orgjftpjtsg ran/WG1RL1/TSGR12b/Docs/.
QUALCOMM Incorporated: "Signalling Mechanisms for TDD UL-DL Reconfiguration", 3GPP Draft, R1-132488, Signaling Mechanism for TDD UL-DL Reconfiguration, 3rd Generation Partnership Project (3GPP), Mobile Competence Centre, 650, Route Des Lucioles, F-06921, Sophia-Antipolis CEDEX, vol. RAN WG1, No. Fukuoka, Japan, 20130520-20130524, May 11, 2013 (May 11, 2013), XP050698206, Retrieved from the Internet: URL:http://www.3gpp.org/ftp/tsg ran/WG14RL1/TSGR1 73/Docs/.
Supplementary European Search Report—EP14832594—Search Authority—The Hague—dated Feb. 23, 2017. (133993EP).
Panasonic: "Signalling Mechanisms for TDD UL-DL Reconfiguration", 3GPP TSG-RAN WG1#72b R1-131326, 3GPP, Apr. 5, 2013, pp. 1-2.
Texas Instruments: "Signaling Mechanisms for Adaptive TDD UL/DL Reconfiguration," 3GPP Draft; R1-131502 Signaling Mechanisms for Adaptive Tdd Reconfiguration, 3rd Generation Partnership Project (3GPP), Mobile Competence Centre ; 650, Route Des Lucioles ; F-06921 Sophia Antipolis CE D3 vol. RAN WG1, No. Chicago, USA; Apr. 15, 2013-Apr. 19, 2013 Apr. 6, 2013 (Apr. 6, 2013), XP050697308, Retrieved from the Internet: URL:http://www.3gpp.org/ftp/tsg_ran/WG1_RL1/TSGR1_72b/Docs/ [retrieved on Apr. 6, 2013], 4 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7

DYNAMIC INDICATION OF TIME DIVISION (TDD) DUPLEX UPLINK/DOWNLINK SUBFRAME CONFIGURATIONS

CLAIM OF PRIORITY UNDER 35 U.S.C. § 119

The present Application for Patent claims priority to PCT Application No. PCT/CN2013/080330, entitled "DYNAMIC INDICATION OF TIME DIVISION (TDD) DUPLEX UPLINK/DOWNLINK SUBFRAME CONFIGURATIONS", filed Jul. 29, 2013, and PCT Application No. PCT/CN2013/081188, entitled "DYNAMIC INDICATION OF TIME DIVISION (TDD) DUPLEX UPLINK/DOWNLINK SUBFRAME CONFIGURATIONS", filed on Aug. 9, 2013, and assigned to the assignee hereof and hereby expressly incorporated by reference herein

BACKGROUND

Field

The present disclosure relates generally to wireless communication, and more particularly, to methods and apparatus for dynamic indication of Time Division Duplex (TDD) Uplink (UL)/Downlink (DL) subframe configurations.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a base station. The method generally includes identifying one or more anchor subframes and one or more non-anchor subframes in a frame, dynamically changing an uplink/downlink configuration of the frame used for communicating with a plurality of user equipments (UEs), and signaling the changed configuration using a common downlink control channel capable of being interpreted by the plurality of UEs in at least one of the one or more anchor subframes of the frame.

Certain aspects of the present disclosure provide a method for wireless communications by a user equipment. The method generally includes monitoring one or more anchor subframes of a frame for a common downlink control channel indicating a changed uplink/downlink configuration of subframes used for communication with at least the UE, and decoding the common downlink control channel to determine the changed uplink/downlink configuration of subframes for use in subsequent communication.

Certain aspects of the present disclosure provide an apparatus for wireless communications by a base station. The apparatus generally includes means for identifying one or more anchor subframes and one or more non-anchor subframes in a frame, means for dynamically changing an uplink/downlink configuration of the frame used for communicating with a plurality of user equipments (UEs), and means for signaling the changed configuration using a common downlink control channel capable of being interpreted by the plurality of UEs in at least one of the one or more anchor subframes of the frame.

Certain aspects of the present disclosure provide an apparatus for wireless communications by a user equipment. The apparatus generally includes means for monitoring one or more anchor subframes of a frame for a common downlink control channel indicating a changed uplink/downlink configuration of subframes used for communication with at least the UE, and means for decoding the common downlink control channel to determine the changed uplink/downlink configuration of subframes for use in subsequent communication.

Aspects generally include methods, apparatus, systems, computer program products, and processing systems, as substantially described herein with reference to and as illustrated by the accompanying drawings. "LTE" refers generally to LTE and LTE-Advanced (LTE-A).

BRIEF DESCRIPTION OF THE DRAWINGS

FIG. 7 illustrates a list of uplink/downlink subframe configurations.

DETAILED DESCRIPTION

Figure 1:
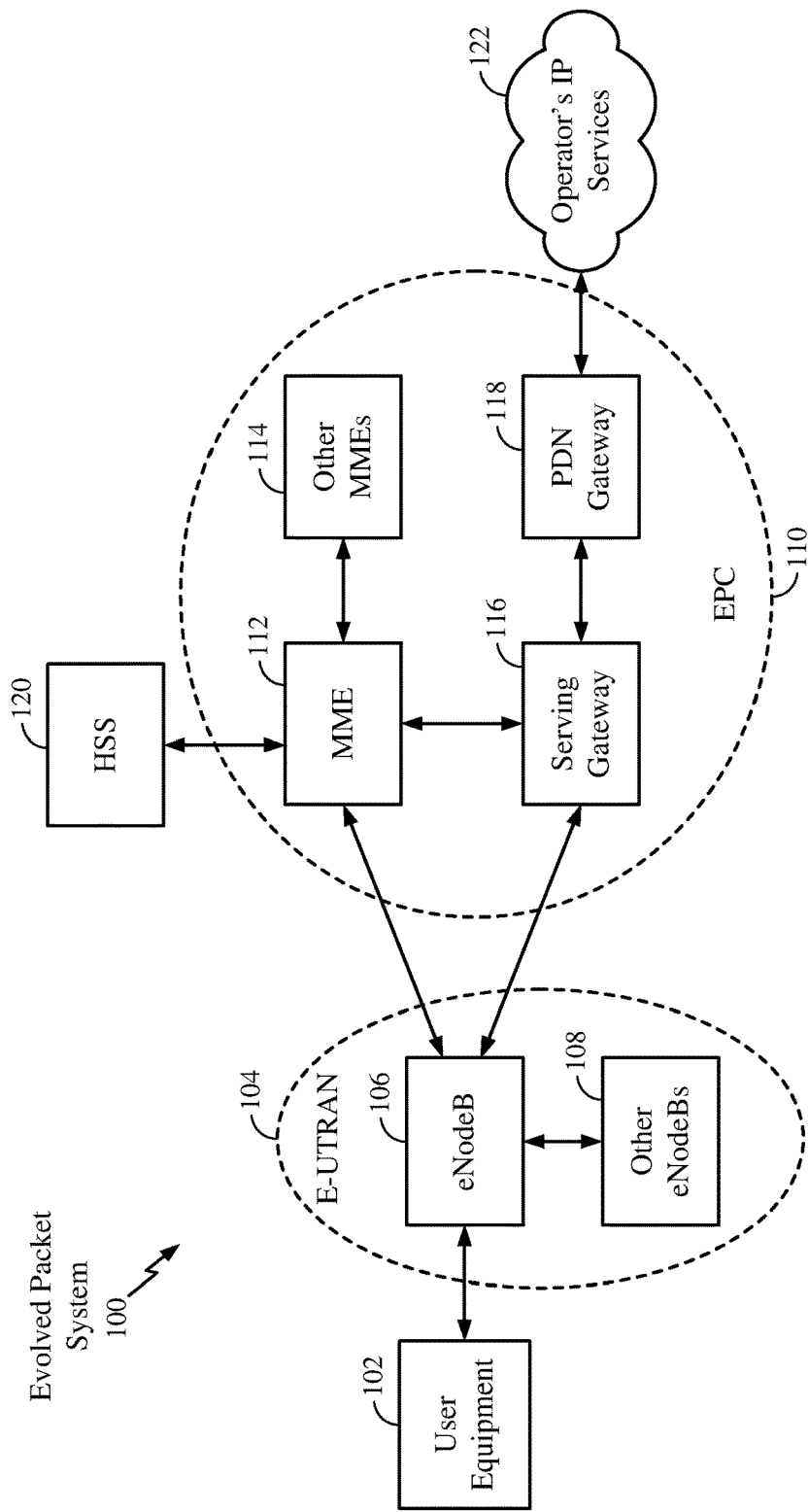
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
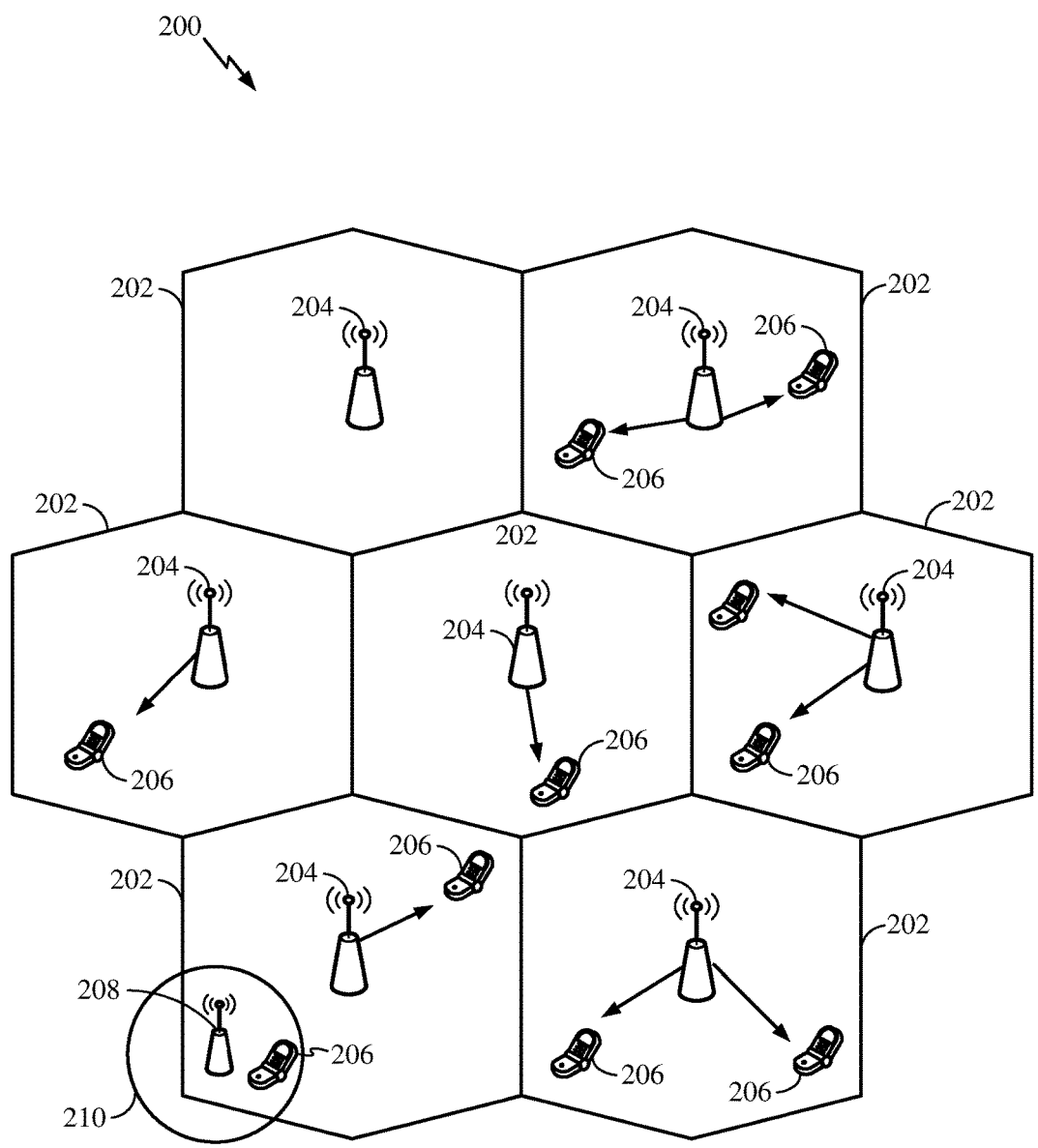
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
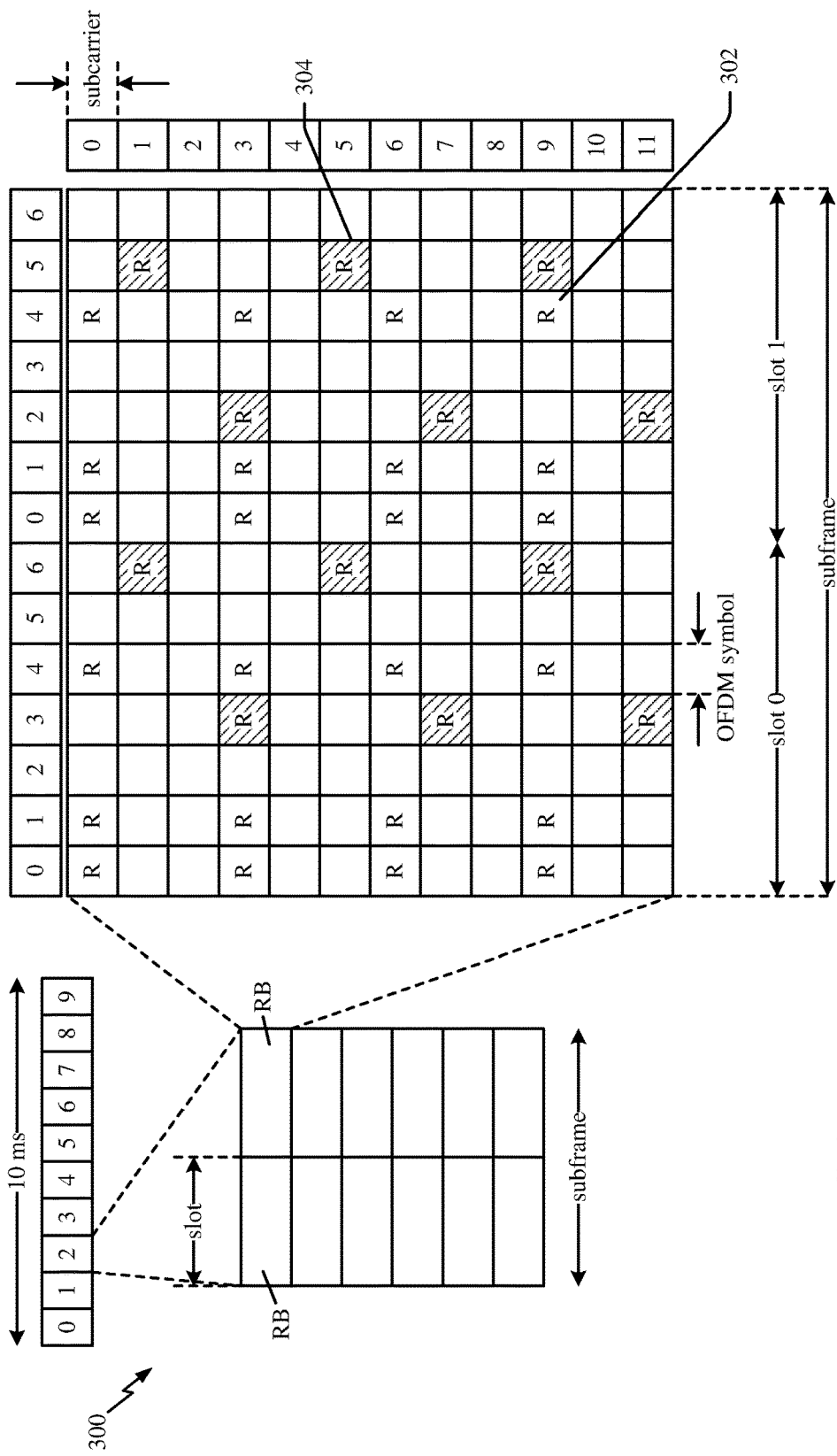
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
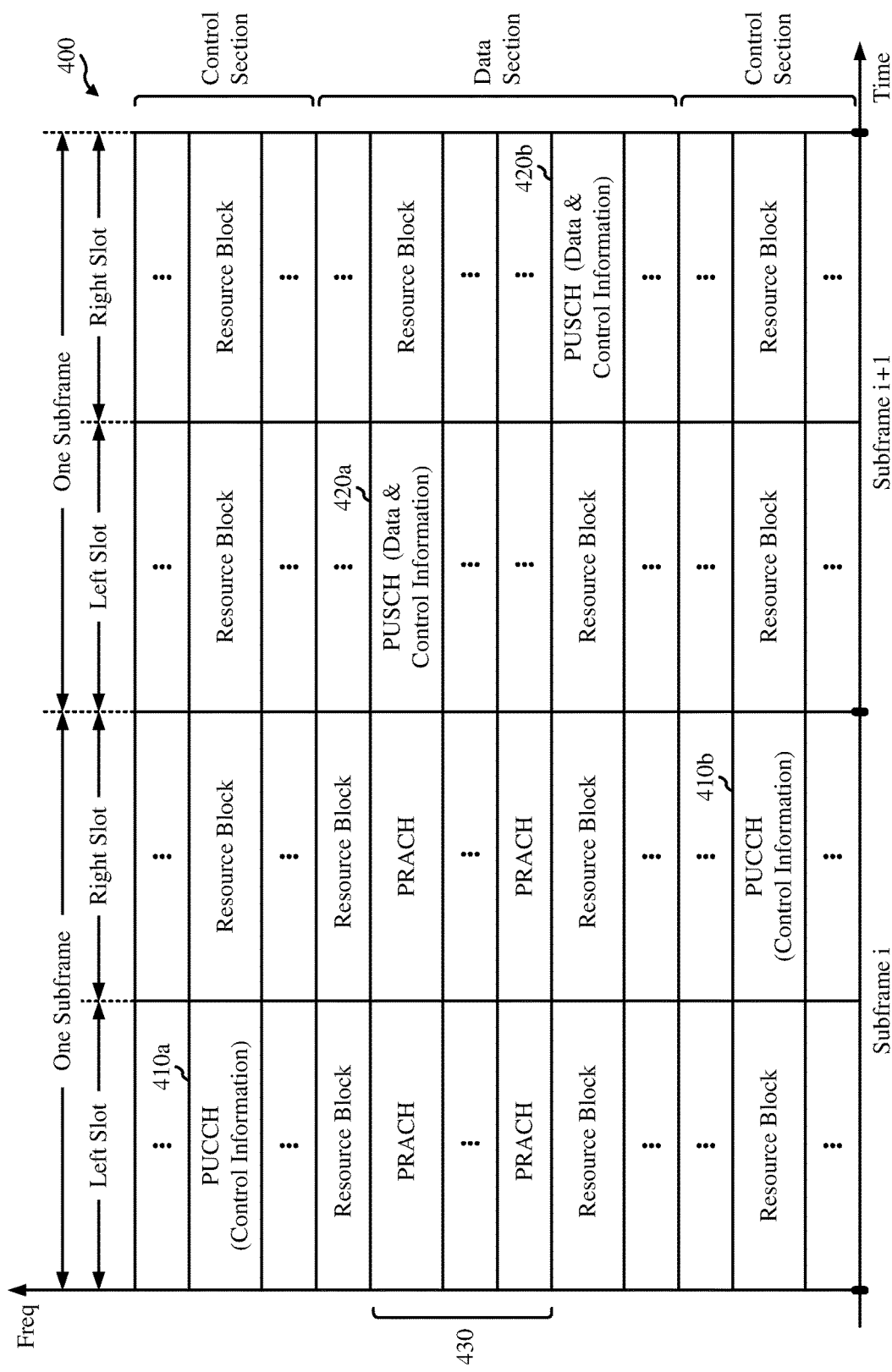
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
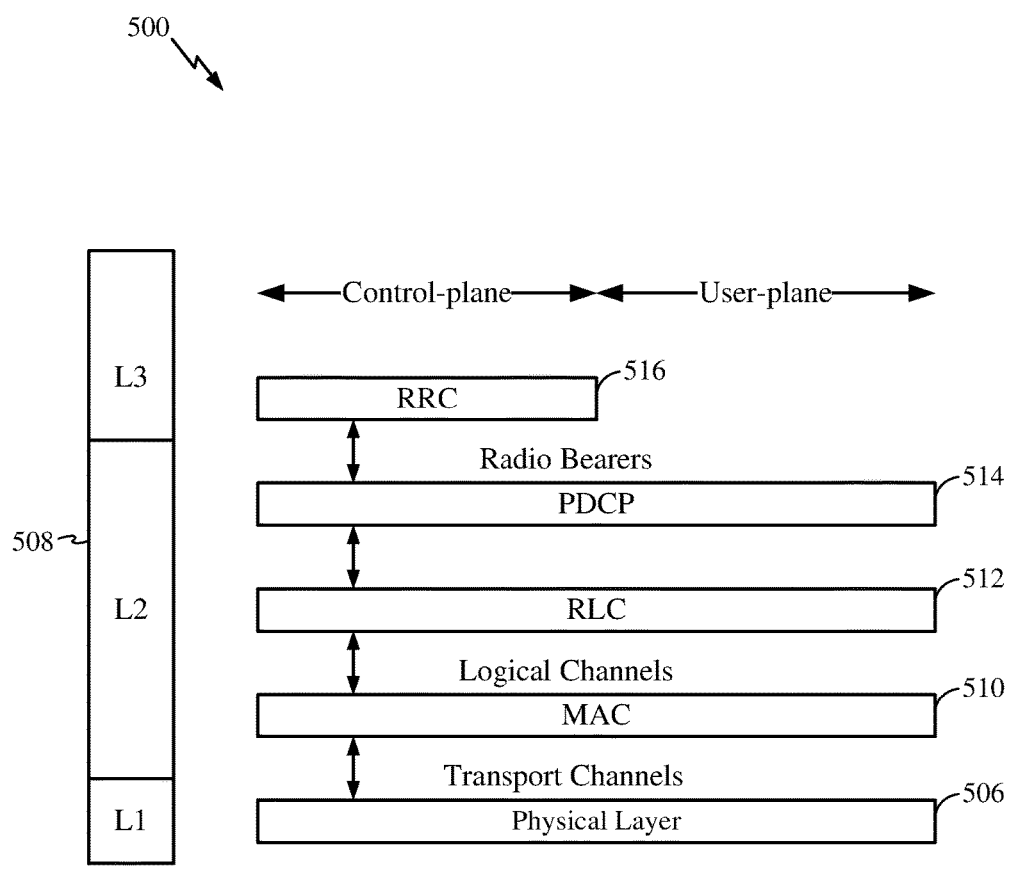
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
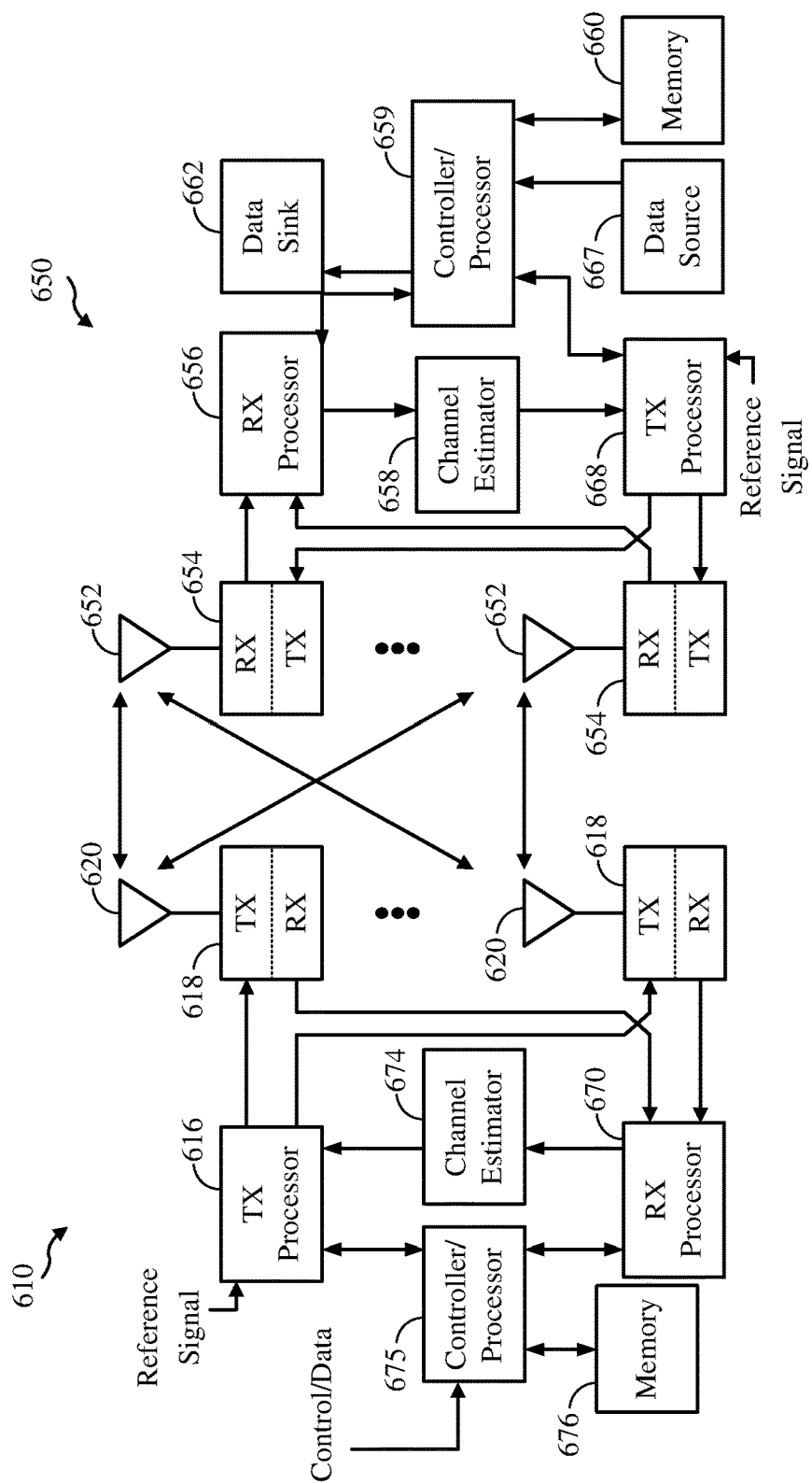
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics.

The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 1300 in FIG. 13, and/or other processes for the techniques described herein, for example. The controller/processor 675 and/or other processors and modules at the eNB 610 may perform or direct operations for example operations 1200 in FIG. 12, and/or other processes for the techniques described herein, for example. In aspects, one or more of any of the components shown in FIG. 6 may be employed to perform example operations 1200 and 1300 and/or other processes for the techniques described herein.

Evolved Interference Management for Traffic Adaptation (EIMTA)

Figure 8:
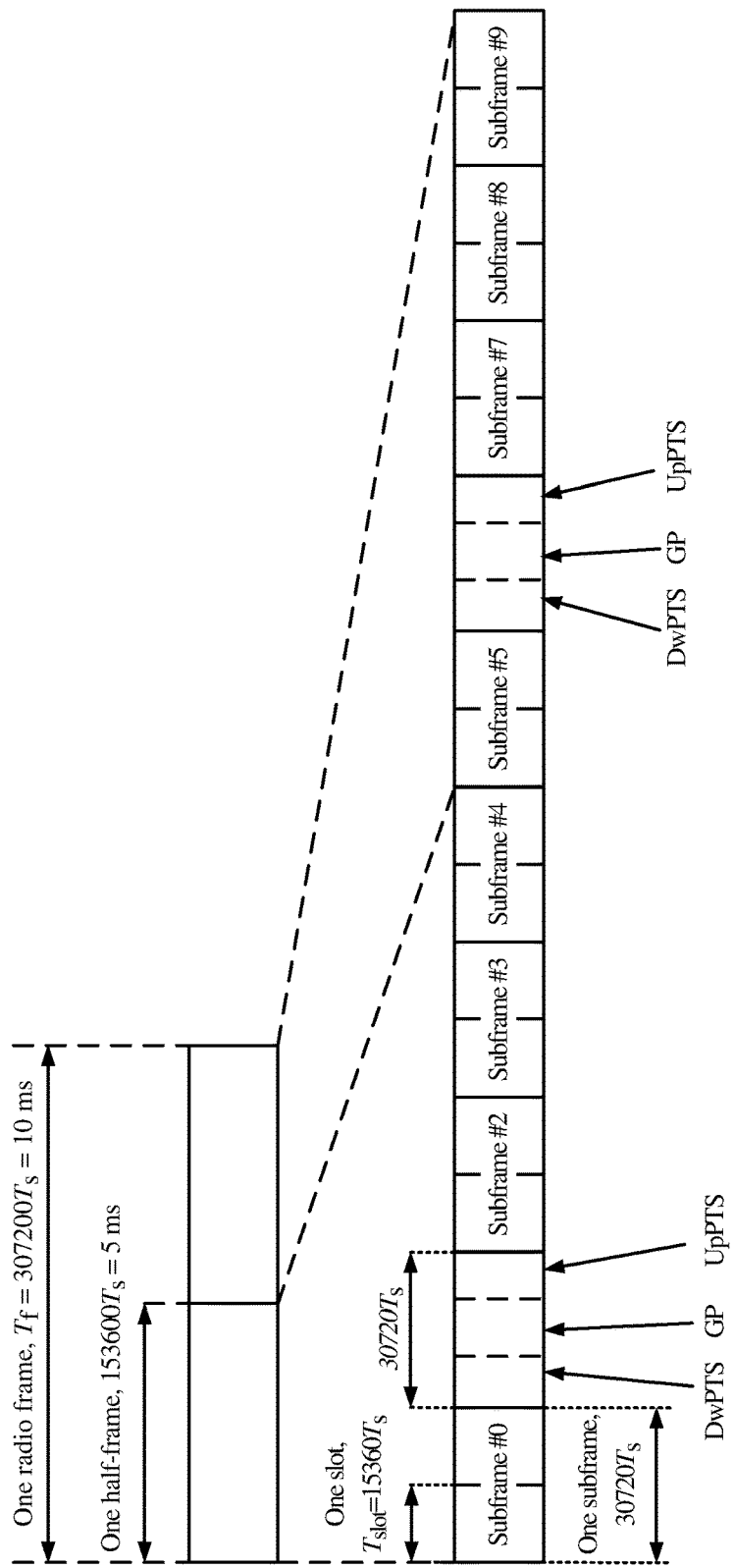
FIG. 8 illustrates an example subframe frame format.

In certain wireless communications networks, such as LTE networks, both Frequency Division Duplex (FDD) and (TDD) frame structures are supported. For TDD, 7 possible DL and UL subframe configurations are supported, as shown in FIG. 7. It may be noted that there are 2 switching periodicities, 5 ms and 10 ms. For 5 ms, there are two special subframes in one frame (10 ms)—as illustrated in FIG. 8. For 10 ms, there is one special subframe in one frame. The present methods and apparatus may be employed when a larger or smaller number of subframe configurations are supported.

In LTE Rel-12, it is possible to dynamically adapt TDD DL/UL subframe configurations based on the actual traffic needs, also known as evolved interference management for traffic adaptation (eIMTA). For example, if during a short duration, a large data burst on downlink is needed, the subframe configuration may be changed, for example, from config #1 (6 DL:4 UL) to config #5 (9 DL:1 UL). In some cases, the adaptation of TDD configuration is expected to be no slower than 640 ms. In an extreme case, the adaptation may be expected to be as fast as 10 ms, although this may not be desirable.

In certain aspects, the adaptation, however, may cause overwhelming interference to both downlink and uplink when two or more cells have different downlink and uplink subframes. In addition, the adaptation may cause some complexity in DL and UL HARQ timing management. In certain aspects, each of the seven DL/UL subframe configurations has its own DL/UL HARQ timing. The DL/UL HARQ timing is optimized for each configuration (e.g., in terms of HARQ operation efficiency). For example, the timing from PDSCH to the corresponding ACK/NAK may be different for different TDD DL/UL subframe configurations (e.g., depending on when the next available uplink subframe occurs for sending the ACK/NAK).

Dynamical switching among the 7 configurations (or even more, if more flexible adaptation is deemed as necessary) implies that if current DL/UL HARQ timing is kept, there may be missed ACK/NAK transmission opportunities for some of the DL or UL transmissions.

In certain aspects, in order to simplify the operations for enhanced (or evolved) interference mitigation with traffic adaptation (eIMTA), it is possible to define a single DL/UL configuration as a reference for many physical layer operations. For instance, DL HARQ operations may be based on DL/UL subframe configuration #5, regardless of the actual DL/UL subframe configuration in use in a frame (or half a frame).

That is, if dynamic DL/UL subframe configuration is enabled, the DL HARQ timing may be always based on the 9:1 DL/UL subframe configuration. Similarly, UL HARQ operation can be based, for example, on DL/UL subframe configuration #0, regardless of the actual DL/UL subframe configuration in use in a frame (or half a frame). That is, if dynamic DL/UL subframe configuration is enabled, the UL HARQ timing may be always based on the 4:6 DL/UL subframe configuration, as illustrated in FIG. 9.

Figure 9:
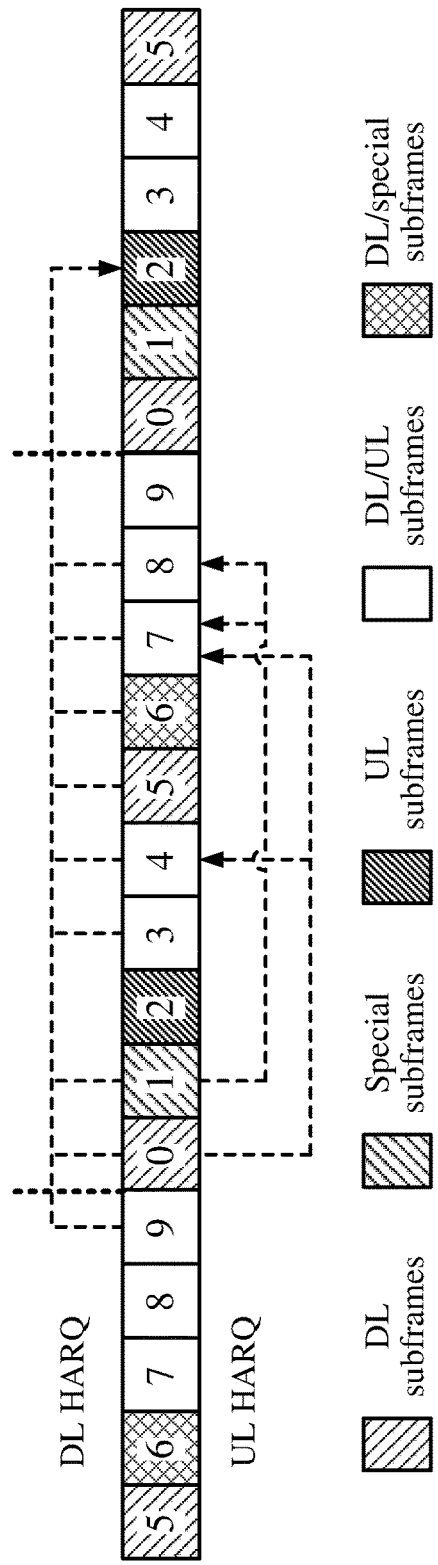
FIG. 9 illustrates an example use of reference uplink/downlink subframe configurations.

As shown in FIG. 9, the actual usage of a subframe may be subject to eNB scheduling. For example, Subframes 3/4/5/7/8/9 may either be DL or UL subframes, while subframe 6 may either be DL or special subframe.

Enabling Common (e)PDCCH To Dynamically Indicate TDD DL/UL Subframe Configuration Aspects of the present disclosure discuss techniques for dynamic indication of the TDD UL/DL subframe configuration to UEs. In certain aspects common PDCCH or ePDCCH (enhanced PDCCH) capable of being interpreted by a plurality of UEs may be used for indicating the TDD DL/UL configuration to one or more UEs.

In certain aspects, the common PDCCH (or ePDCCH) is typically associated with a common search space that carries the DCIs (Downlink Control Information) that are common for a plurality of UEs. In an aspect, each PDCCH carries one DCI and is identified by RNTI (Radio Network Temporary Identifier) implicitly encoded in the CRC attachment of the DCI.

In certain aspects, dynamic indication of TDD DL/UL subframe configuration is expected for UEs in RRC_CONNECTED state only. Therefore, in certain aspects, dynamic indication via common PDCCH may be enabled via a common RNTI, for example, DTC (Dynamic TDD DL/UL configuration)-RNTI. In an aspect, the selection of a 16-bit DTC-RNTI may follow the same rules as C-RNTI (Cell-RNTI) and avoiding RNTIs used by P-RNTI, SI-RNTI, RA-RNTI, TPC RNTI etc. In an aspect, a corresponding PDCCH CRC (Cyclic Redundancy Check) may be scrambled by the DTC-RNTI.

In certain aspects, the size of the common PDCCH may either match an existing DCI format or may be a new format. For example, the size of common PDCCH may be small or similar to that of DCI format 1C. In an aspect, the common PDCCH may include 3-bits indicating the configuration, 5 bits reserved, 16-bit CRC, for a total of 24 bits, which is that same size as DCI format 1C under 1.4 MHz or 6-RB system bandwidth. In an aspect the size of the common PDCCH may be bandwidth independent. Hereinafter, the DCI format for the common PDCCH will be referred to as DCI format 5.

Aspects of the present disclosure are directed to anchor subframe based design. Referring back to the TDD configurations of FIG. 7, four of the subframes are aligned among all subframes (i.e., subframes 0, 1, 2 and 5). In addition, in subframe 6, the downlink transmissions are partially aligned. The subframes that align (i.e., the subframes that do not change across configurations) may also be referred to as the anchor subframes. Thus, anchor subframes may include subframes 0, 1, 2 and 5. Further, subframe 6 may be considered an anchor subframe because the downlink transmissions are partially aligned. The subframes that do not align (i.e., the subframes that change across different configurations) may be referred to as non-anchor subframes.

In certain aspects, the adaptive TDD configurations may be improved based on the anchor subframes. In certain aspects, the common PDCCH may only be carried in DL anchor subframes, but may not have to be carried in all DL anchor subframes.

Figure 10:
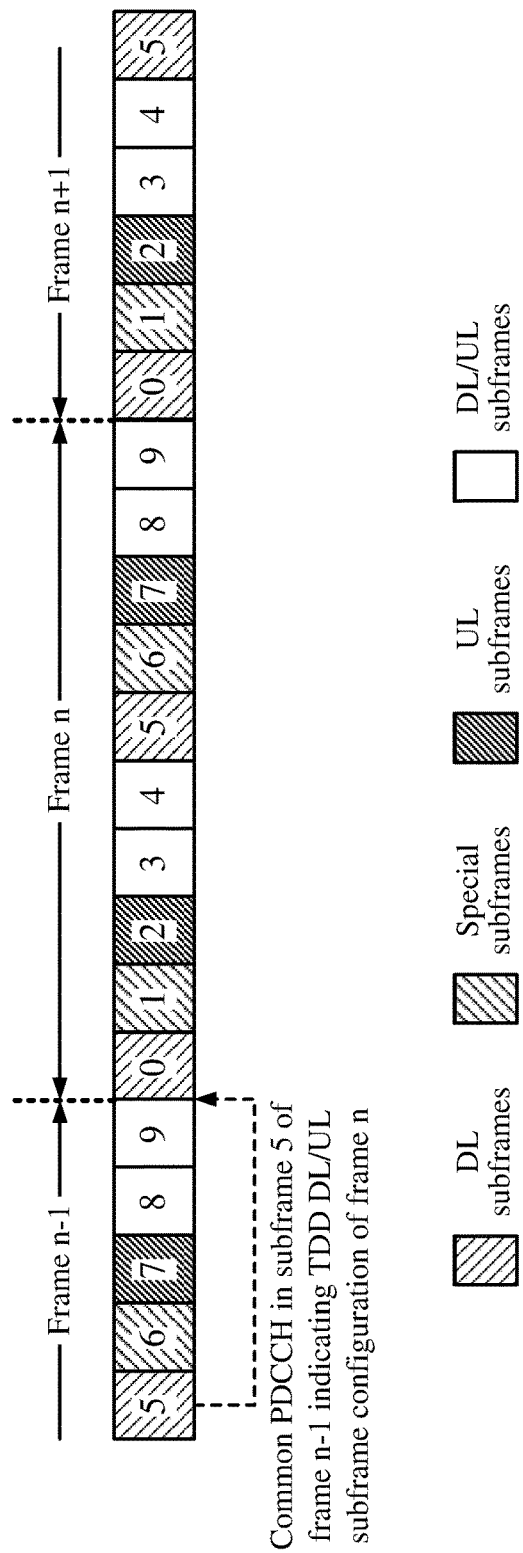
FIG. 10 illustrates example transmission of common PDCCH, in accordance with aspects of the present disclosure.

In certain aspects, the common PDCCH indicating a TDD DL/UL subframe configuration may be transmitted in early subframes of a frame, or even earlier, for example in a previous frame to allow both eNB and UE to react to the new configuration. For example, to give UE enough time to decode the common PDCCH and determine the TDD UL/DL subframe configuration. FIG. 10 illustrates transmission of the common PDCCH in subframe 5 of frame n−1 indicating TDD DL/UL subframe configuration of frame n.

In certain aspects, a set of subframes for UE to monitor DCI format 5 may be pre-determined, or indicated by signaling (e.g., broadcast or unicast). For example, subframe 5 of all frames may be predetermined to carry the common PDCCH. In an aspect, one of the SIBs, may indicate which subframes/frames carry DCI format 5. In an aspect, dedicated signaling may be used to indicate which subframes/frames carry DCI format 5. In certain aspects, a same subframe configuration indication may be transmitted in multiple subframes. UEs may monitor the multiple subframes for the same TDD DL/UL subframe configuration indication, in order to facilitate eNB control load balancing and Discontinuous Reception (DRX) operation for the UEs. For example, UEs may monitor the common PDCCH in both subframes 5 and 6.

In certain aspects, different UEs may have different DRX operation. For example, a UE1 may monitor subframe 5 and another UE2 may monitor 6 due to the DRX operation being subframe specific. Therefore, in an aspect, the set of subframes for a UE to monitor DCI format 5 may be tied with its DRX operation. This, for example, may ensure that there is at least one subframe carrying DCI format 5 in certain duration. In an aspect, a UE may need to pre-wake-up to monitor DCI format 5 before ON duration, especially during long DRX. In an aspect, if a UE cannot detect the common PDCCH, it may fall back to a legacy or reference configuration.

In certain aspects, the eNB may consider transmitting the common PDCCH in at least two DL anchor subframes to increase reliability. From UE perspective, it may monitor the common PDCCH in at least two DL subframes and may also combine the two DL subframes for joint decoding (TTI bundling for PDCCH) for more time diversity. For example, compared with one level 4 PDCCH transmission in one subframe, there may be 2 level 2 PDCCH transmissions in two subframes.

In an aspect, reliability of the common PDCCH may further be increased by power control.

Figure 11:
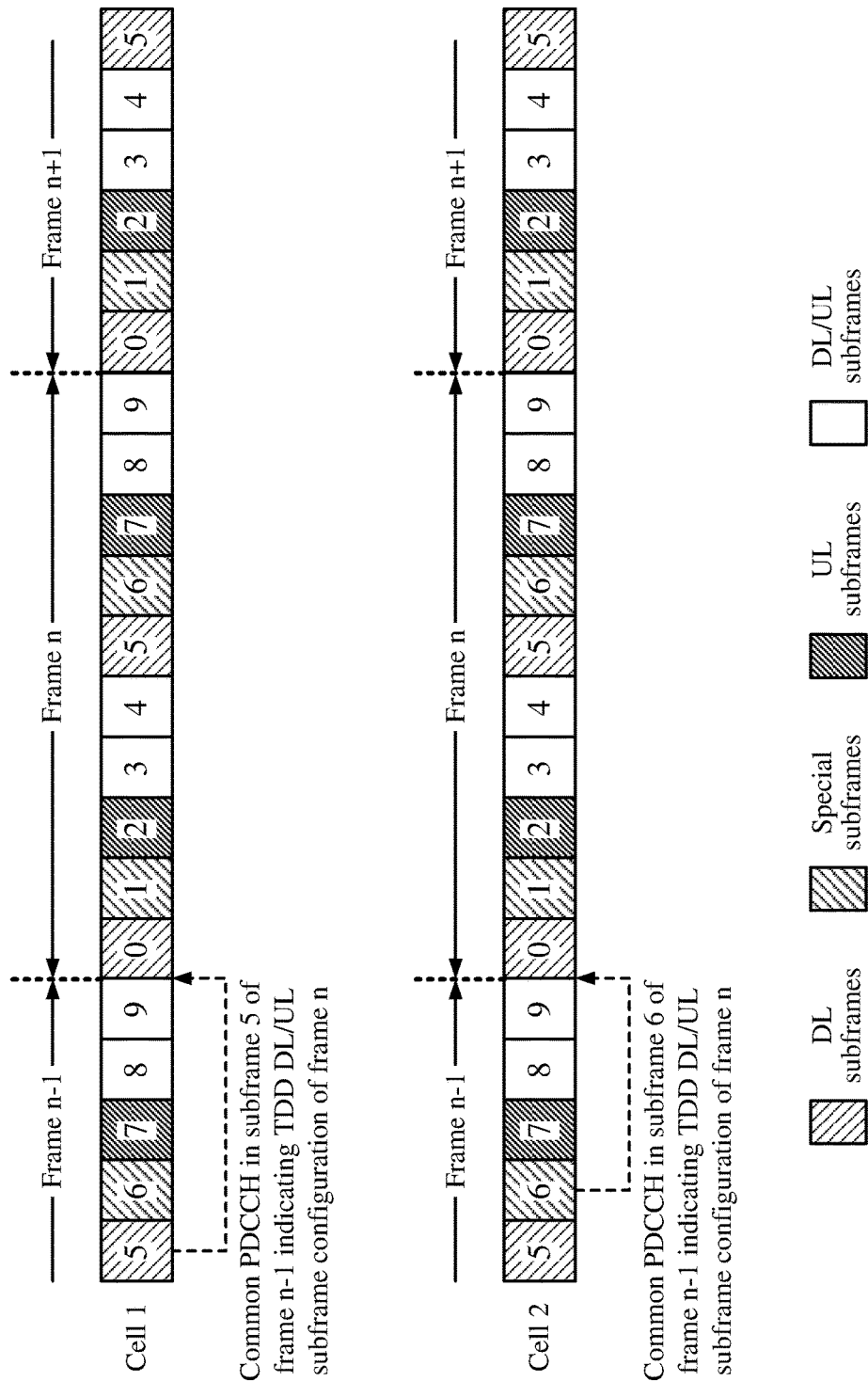
FIG. 11 illustrates example transmission of common PDCCH at different locations in different cells, in accordance with aspects of the present disclosure.

In certain aspects, there may be restriction on the sets of usable subframes. For example, some subframes may experience interference on UL or DL and thus an eNB may use only certain subframes (e.g., subframes when interfering cell(s) is configured with almost blank subframes). As a result, the set of subframes for use may be restricted. Thus, in an aspect, the time location of the common PDCCH may be different for different cells. For example, as shown in FIG. 11, cell 1 uses subframe 5 while cell 2 uses subframe 6 for transmitting the common PDCCH.

In certain aspects, for the purposes of blind decoding, in subframes where the common PDCCH is transmitted, the UE may not be required to decode DCI format 1C. In an aspect, the set of decoding candidates originally monitored for DCI format 1C may be used for DCI format 5, thus maintaining the same number of blind decodes as DCI format 5. Hence, the new DCI format may replace DCI format 1C for UEs to monitor certain subframes. As a result, there is no increase of the number of DCI sizes to monitor.

In certain aspects, in order to maintain the same number of maximum number of blind decodes, the number of decoding candidates for DCI format 5 should be the same as DCI format 1C. However, the set of aggregation levels for DCI format 5 may be may be revised to be different from that of DCI format 1C (which typically has 4 decoding candidates for level 4, and 2 decoding candidates for level 8—total of 6 decoding candidates) in order to accommodate DCI format 5. In an aspect, the motivation is that for a payload size of 24 bits, 2 CCEs (or 72 REs) results in a coding rate of 24/2(QPSK)/72=⅙, which should be enough to cover the majority of cases especially considering the small cell context. An example set of aggregation levels are $\{1, 2, 2, 1\}$ for aggregation levels $\{1, 2, 4, 8\}$, respectively. i.e. we can still support original aggregation levels $\{1, 2, 4, 8\}$ for DCI format 5, but in order to maintain same decoding candidates aggregation levels $\{1, 2, 2, 1\}$ may be used for aggregation levels $\{1, 2, 4, 8\}$.

For DCI format 1C, the common search space always starts from CCE 0. In an aspect, for DCI format 5 the common search space may also start with CCE 0. But this may be restrictive as it may collide with common search space transmissions. That is, for DCI format 5 the starting CCE of each aggregation level may be the same common search space for the same aggregation levels and within the common search space for other new aggregation levels, but restrictive given that it may collide with common search space related operations (e.g., paging, RAR response, system information broadcast, etc.). As a result, two alternatives may be designed to address this concern.

In a first alternative, starting CCE may be configured via RRC signaling. The RRC configuration may be aggregation level dependent and/or subframe dependent. It may be common to all UEs of a cell, or common to a group of UEs of a cell, but different for different groups (two or more groups) of UEs of the cell.

In a second alternative, the starting CCE may be derived based on DTC-RNTI, similar to C-RNTI. This approach is simple and at the same time effective. Further simplification may be possible, e.g., the starting CCE for all aggregation levels may be the same (e.g., based on level 8).

In certain aspects, dynamic indication of the TDD UL/DL subframe configuration may be supported via ePDCCH. In an aspect, the discussions earlier for the common PDCCH may be largely applied for ePDCCH, but with some differences. For instance, distributed ePDCCH may preferably be used for the common EPDCCH DCI format 5. In an aspect, it is sufficient that the common EPDCCH is located in one resource set, if the UE is configured with two ePDCCH resource sets. In certain aspects, if the UE is configured with localized ePDCCH resource set(s) only, dynamic indication may be conveyed via some localized ePDCCH.

In certain aspects, the UE may monitor only one of common PDCCH or common ePDCCH for dynamic indication of TDD subframe configuration. Alternatively, the UE may monitor both common PDCCH or common ePDCCH for dynamic indication of TDD subframe configuration if the UE is configured to monitor PDCCH and ePDCCH over different subframes.

In certain aspects, if it is assumed that DCI format 5 replaces DCI format 1C, there may be concerns of reduced paging opportunities due to loss of DCI format 1C in some subframes. In certain aspects, UEs may be allowed to monitor both DCI format 5 and DCI format 1C in the same subframe. In an aspect, the size of DCI format 5 may be the same or different from that of DCI format 1C. In the case of same size, some bit(s) inside the payload may be used to differentiate 1C from 5. However, if the sizes of the formats 5 and 1C are different, in order to maintain the same number of blind decodes (or to minimize the total number of blind decodes), splitting the decoding candidates may be considered between 1C and 5 in one subframe for the UE to monitor. For example, 3 decoding candidates for 5 (2 level 2 and 1 level 4), and 3 decoding candidates for DCI format 1C (2 level 4 and 1 level 8). In an aspect, there may also be an uneven split of decoding candidates between the two formats.

In CoMP scenario 4, a macro cell and its associated small cells may have the same PCI. As a result, if the search space for DCI format 5 is only dependent on PCI, search space for DCI format 5 may collide. Thus, in an aspect, differentiation of DCI format 5 for macro cell and its associated small cells of the same PCI should be supported. In an aspect, this may be accomplished by non-overlapping DCI format 5 search spaces for macro and small cells, e.g., by configuring different starting CCEs or ECCEs. In alternative aspects, same search space may be used, but within each DCI format, an index may be included identifying a small cell within the same cluster of the same PCI (e.g., similar to DCI 3/3A based group power control, where each TPC_index corresponds to a particular UE). In an aspect, UEs may be further indicated the mapping between the indices and the small cells.

In certain aspects, DTC-RNTI may be configured differently for different small cells of the same PCI. That is, for a same PCI, UEs may be required to monitor two or more DTC-RNTIs. The corresponding search spaces for the two or more DTC-RNTIs may be the same or separately defined (e.g., based on each individual DTC-RNTI).

In certain aspects, the common PDCCH or the common ePDCCH may further carry an information field identifying one or more frames that a TDD DL/UL subframe configuration should be applied. As an example, the information field may be a 2-bit information field, and indicates the TDD DL/UL subframe configuration should be applied to one of the current frame (N), the next frame (N+1), frame N+2, or frame N+3, where the current frame N is the frame where the common PDCCH or the common ePDCCH is transmitted.

In certain aspects, the common PDCCH or the common ePDCCH may further carry an information field identifying a duration that a TDD DL/UL subframe configuration should be applied. As an example, the information field may be a 2-bit information field, and indicates the TDD DL/UL subframe configuration should be applied to one of 1, 2, 4 or 8 frames starting from the current frame (N), where the current frame N is the frame where the common PDCCH or the common ePDCCH is transmitted.

In certain aspects, the applicability of a TDD DL/UL subframe configuration conveyed in a common PDCCH or a common ePDCCH depends on the subframe indices in a frame where the PDCCH or the ePDCCH is transmitted. As an example, if the PDCCH or ePDCCH is transmitted in the first half of a frame (i.e., subframes 0 to 4), the TDD DL/UL subframe configuration in the control channel is applicable to the current frame; if the PDCCH or ePDCCH is transmitted in the second half of a frame (i.e., subframes 5 to 9), the TDD DL/UL subframe configuration in the control channel is applicable to the next frame.

Figure 12:
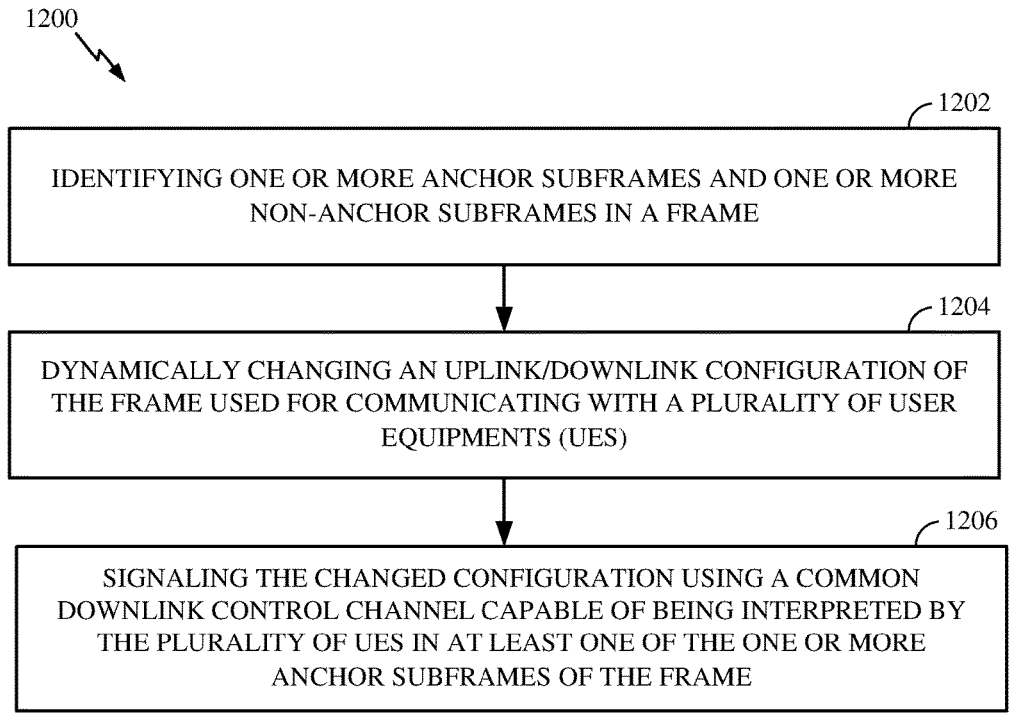
FIG. 12 illustrates example operations performed, for example, by a base station (BS) for dynamic indication of TDD UL/DL subframe configuration, in accordance with aspect of the disclosure.

FIG. 12 illustrates example operations 1200 performed, for example, by a base station (BS) for dynamic indication of TDD UL/DL subframe configuration, in accordance with aspect of the disclosure. Operations 1200 may begin, at 1202, by identifying one or more anchor subframes and one or more non-anchor subframes in a frame. At 1204 the BS may dynamically change an uplink/downlink configuration of the frame used for communicating with a plurality of UEs. At 1206, the BS may signal the changed configuration using a common downlink control channel capable of being interpreted by the plurality of UEs in at least one of the one or more anchor subframes of the frame.

In certain aspects, size of the common downlink control channel may be same as the size defined for a legacy LTE DCI format. In an aspect, the legacy LTE DCI format may include DCI format 1C. In certain aspects, the size of the common downlink control channel may be independent of a downlink system bandwidth.

In certain aspects, the base station may scramble CRC code of the common downlink control channel by RNTI specific to the common downlink control channel. In certain aspects, the base station may configure two or more RNTI values for cells of a same physical cell identity (PCI), wherein each of the plurality of UEs is indicated to monitor only one of the two or more RNTI values.

In certain aspects, the signaling of the changed configuration may include transmitting the common downlink control channel only in a subset of the one or more anchor subframes of the frame.

In certain aspects, the signaling of the changed configuration may include comprises transmitting the common downlink control channel in the one or more anchor subframes of the frame for indicating the uplink/downlink configuration for another subsequent frame.

In certain aspects, the base station may indicate to at least one UE of the plurality of UEs via explicit signaling a set of subframes configured to carry the common downlink control channel. In an aspect, the explicit signaling may include signaling via a System Information Block (SIB). In an aspect, the explicit signaling may include dedicated signaling for the indication. In an aspect, a set of subframes configured to carry the common downlink control channel may be pre-determined.

In certain aspects the base station my determine a set of subframes to carry the common downlink control channel for each UE based on a DRX operation of the UE such that at least one subframe carries the downlink control channel in a DRX ON duration.

In certain aspects, the signaling of the changed configuration may include transmitting the common downlink control channel in at least two downlink anchor subframes.

In certain aspects, the time location of a subframe carrying the common downlink control channel may be different for different cells.

In certain aspects, the signaling of the changed configuration may include transmitting the common downlink control channel in a subframe originally configured for transmission of a legacy downlink control channel such that a number of decoding candidates for blind decoding the common downlink control channel is same as a number of decoding candidates for blind decoding the legacy downlink control channel. In an aspect, transmission of the common downlink control channel may replace the transmission of the legacy downlink control channel in the subframe. In an aspect, starting CCEs of search spaces for blind decoding of the common downlink control channel and the legacy downlink control channel may be the same. In an aspect, the starting CCE of a search space for blind decoding of the common downlink control channel may be configured via Radio Resource Control (RRC) signaling. In an aspect, the RRC signaling is UE-specific. In an aspect, the starting CCE of a search space for blind decoding of the common downlink control channel may be derived based on a Radio Network Temporary Identifier (RNTI) specific to the common downlink control channel.

In certain aspects, the base station may further transmit the common downlink control channel and the legacy downlink control channel simultaneously in the subframe. In an aspect, the sizes of the common downlink control channel and the legacy downlink control channel may be the same. In an aspect, the base station may transmit a bit to differentiate between the common downlink control channel and the legacy downlink control channel.

In certain aspects, the uplink/downlink configuration of the subframes may include a Time Division Duplex (TDD) Uplink-Downlink configuration. In certain aspects, the common downlink control channel may include PDCCH or ePDCCH.

In certain aspects, a search space for blind decoding of the common downlink control channel may include candidates of at least one of aggregation level 1, aggregation level 2, aggregation level 4, or aggregation level 8.

In certain aspects, the common downlink control channel may include information about one or more frames to which the changed configuration is to be applied. In an aspect, the common downlink control channel may include an information field to carry the information about the one or more frames.

In certain aspects, the common downlink control channel may include information about a duration for which the changed configuration is to be applied. In an aspect, the duration may include one or more frame lengths. In an aspect, the information may include a start frame number of a frame starting from which the changed configuration is to be applied for the duration.

In certain aspects, application of the changed configuration to one or more frames may be a function of a location of transmission of the common downlink control channel within the frame. In an aspect, if the common downlink control channel is transmitted in a first portion of the frame, the changed configuration may be applied to the frame. In an aspect, if the common downlink control channel is transmitted in a second portion of the frame, the changed configuration may be applied to a subsequent frame. In an aspect, the first and second portions of the frame may include the first and second halves of the frame respectively.

Figure 13:
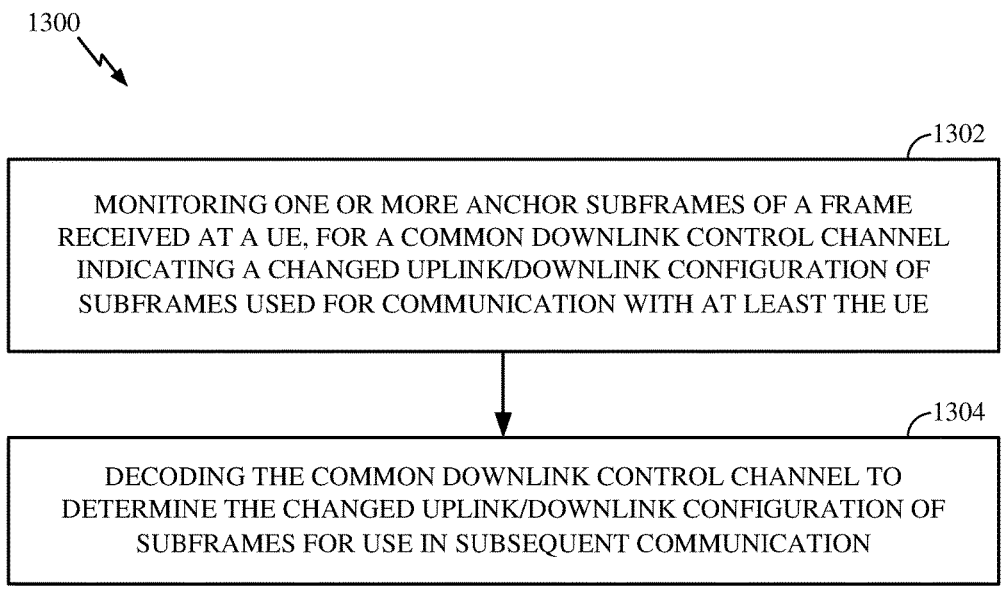
FIG. 13 illustrates example operations performed, for example, by a user equipment (UE) for dynamic indication of TDD UL/DL subframe configuration, in accordance with aspect of the disclosure.

FIG. 13 illustrates example operations 1300 performed, for example, by a user equipment (UE) for dynamic indication of TDD UL/DL subframe configuration, in accordance with aspect of the disclosure. Operations 1300 may begin, at 1302, by monitoring one or more anchor subframes of a frame for a common downlink control channel indicating a changed uplink/downlink configuration of subframes used for communication with at least the UE. At 1304, the UE may decode the common downlink control channel to determine the changed uplink/downlink configuration of subframes for use in subsequent communication.

In certain aspects, the size of the common downlink control channel is same as the size defined for a legacy LTE DCI format. In certain aspects, the size of the common downlink control channel may be independent of a downlink system bandwidth. In an aspect, the legacy LTE DCI format may include DCI format 1C.

In certain aspects, the CRC code of the common downlink control channel may be scrambled by RNTI specific to the common downlink control channel. In certain aspects, two or more RNTI values may be configured for cells of a same physical cell identity (PCI), wherein the UE monitors only one of the two or more RNTI values.

In certain aspects, the indication of the changed configuration may include the common downlink control channel only in a subset of the one or more anchor subframes of the frame.

In certain aspects, the indication of the changed configuration may include the common downlink control channel in the one or more anchor subframes of the frame indicating the uplink/downlink configuration for another subsequent frame In certain aspects, the UE may receive indication via explicit signaling of a set of subframes configured to carry the common downlink control channel. In an aspect, the explicit signaling may include signaling via a SIB. In an aspect, the explicit signaling may include dedicated signaling for the indication. In an aspect, a set of subframes configured to carry the common downlink control channel may be pre-determined.

In certain aspects, a set of subframes carrying the common downlink control channel for each UE is based on a DRX operation of the UE such that at least one subframe carries the downlink control channel in a DRX ON duration.

In certain aspects, the indication of the changed configuration may include the common downlink control channel in at least two downlink anchor subframes.

In certain aspects, the time location of a subframe carrying the common downlink control channel may be different for different cells.

In certain aspects, the UE may determine one or more frames to apply the changed configuration as a function of a location of transmission of the common control channel within the frame. In an aspect, if the common downlink control channel is transmitted in a first portion of the frame, the changed configuration may be applied to the frame itself. In an aspect, if the common downlink control channel is transmitted in a second different portion of the frame, the changed configuration may be applied to a subsequent frame. In an aspect, the first and second portions of the frame may include first and second halves of the frame respectively.

In certain aspects, the UE may determine a duration for which the changed configuration is to be applied based on information transmitted in the common downlink control channel.

In certain aspects, the indication of the changed uplink/downlink configuration may include the common downlink control channel in a subframe originally configured for transmission of a legacy downlink control channel such that a number of decoding candidates for blind decoding the common downlink control channel is same as a number of decoding candidates for blind decoding the legacy downlink control channel. In an aspect, the common downlink control channel may replace the legacy downlink control channel in the subframes. In an aspect, starting CCEs of search spaces for blind decoding of the common downlink control channel and the legacy downlink control channel may be the same. In an aspect, the starting CCE of a search space for blind decoding of the common downlink control channel was configured via Radio Resource Control (RRC) signaling. In an aspect, the RRC signaling may be UE-specific. In an aspect, the starting CCE of a search space for blind decoding of the common downlink control channel was derived based on a Radio Network Temporary Identifier (RNTI) specific to the common downlink control channel. In an aspect, the common downlink control channel and the legacy downlink control channel may be received simultaneously in the subframe. In an aspect, the sizes of the common downlink control channel and the legacy downlink control channel may be the same. In an aspect, the indication of the configuration may include a bit to differentiate between the common downlink control channel and the legacy downlink control channel.

In certain aspects, the uplink/downlink configuration of the subframes may include a Time Division Duplex (TDD) Uplink-Downlink configuration.

In certain aspects, the common downlink control channel comprises PDCCH or ePDCCH.

In certain aspects, a search space for blind decoding of the common downlink control channel may include candidates of at least one of aggregation level 1, aggregation level 2, aggregation level 4, or aggregation level 8

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of wireless communication by a base station, comprising:
   identifying one or more anchor subframes and one or more non-anchor subframes in a frame;
   dynamically changing an uplink/downlink configuration of the frame used for communicating with a plurality of user equipments (UEs); and
   signaling the changed configuration using a common downlink control channel capable of being interpreted by the plurality of UEs in at least one of the one or more anchor subframes of the frame,
   wherein application of the changed configuration to one or more frames is a function of a location of reception of the common downlink control channel within the frame.

2. The method of claim 1, wherein a size of the common downlink control channel is same as a size defined for a legacy Long Term Evolution (LTE) Downlink Control Information (DCI) format.

3. The method of claim 1, wherein a size of the common downlink control channel is independent of a downlink system bandwidth.

4. The method of claim 1, further comprising scrambling Cyclic Redundancy Check (CRC) code of the common downlink control channel by Radio Network Temporary Identifier (RNTI) specific to the common downlink control channel.

5. The method of claim 1, further comprising configuring two or more RNTI values for cells of a same physical cell identity (PCI), wherein each of the plurality of UEs is indicated to monitor only one of the two or more RNTI values.

6. The method of claim 1, wherein the signaling comprises transmitting the common downlink control channel only in a subset of the one or more anchor subframes of the frame.

7. The method of claim 1, wherein the signaling comprises transmitting the common downlink control channel in the one or more anchor subframes of the frame for indicating the uplink/downlink configuration for another subsequent frame.

8. The method of claim 1, further comprising indicating to at least one UE of the plurality of UEs via explicit signaling a set of subframes configured to carry the common downlink control channel.

9. The method of claim 1, further comprising determining a set of subframes to carry the common downlink control channel for each UE based on a Discontinuous Reception (DRX) operation of the UE such that at least one subframe carries the downlink control channel in a DRX ON duration.

10. The method of claim 1, wherein the signaling comprises transmitting the common downlink control channel in at least two downlink anchor subframes.

11. The method of claim 1, wherein the common downlink control channel comprises information about a duration for which the changed configuration is to be applied.

12. The method of claim 11, wherein the duration comprises one or more frame lengths.

13. The method of claim 1, wherein if the common downlink control channel is transmitted in a first portion of the frame, the changed configuration is applied to the frame.

14. The method of claim 1, wherein if the common downlink control channel is transmitted in a second portion of the frame, the changed configuration is applied to a subsequent frame.

15. A method of wireless communication by a User Equipment (UE), comprising:
   monitoring one or more anchor subframes of a frame for a common downlink control channel indicating a changed uplink/downlink configuration of subframes used for communication with at least the UE;
   decoding the common downlink control channel to determine the changed uplink/downlink configuration of subframes for use in subsequent communication, and
   determining one or more frames to apply the changed configuration as a function of a location of reception of the common downlink control channel within the frame.

16. The method of claim 15, wherein a size of the common downlink control channel is same as a size defined for a legacy Long Term Evolution (LTE) Downlink Control Information (DCI) format.

17. The method of claim 15, wherein a size of the common downlink control channel is independent of a downlink system bandwidth.

18. The method of claim 15, wherein the Cyclic Redundancy Check (CRC) code of the common downlink control channel is scrambled by Radio Network Temporary Identifier (RNTI) specific to the common downlink control channel.

19. The method of claim 15, wherein the indication of the changed uplink/downlink configuration comprises the common downlink control channel only in a subset of the one or more anchor subframes of the frame.

20. The method of claim 15, wherein the indication of the changed uplink/downlink configuration comprises the common downlink control channel in the one or more anchor subframes of the frame indicating the uplink/downlink configuration for another subsequent frame.

21. The method of claim 15, further comprising receiving indication via explicit signaling of a set of subframes configured to carry the common downlink control channel.

22. The method of claim 15, wherein a set of subframes carrying the common downlink control channel for each UE is based on a Discontinuous Reception (DRX) operation of the UE such that at least one subframe carries the downlink control channel in a DRX ON duration.

23. The method of claim 15, wherein if the common downlink control channel is transmitted in a first portion of the frame, the changed configuration is applied to the frame.

24. The method of claim 15, wherein if the common downlink control channel is transmitted in a second portion of the frame, the changed configuration is applied to a subsequent frame.

25. The method of claim 15, further comprising determining a duration for which the changed configuration is to be applied based on the common downlink control channel.

26. The method of claim 15, wherein the indication of the changed uplink/downlink configuration comprises the common downlink control channel in at least two downlink anchor subframes.

27. An apparatus of wireless communication by a base station, comprising:
   means for identifying one or more anchor subframes and one or more non-anchor subframes in a frame;
   means for dynamically changing an uplink/downlink configuration of the frame used for communicating with a plurality of user equipments (UEs); and
   means for signaling the changed configuration using a common downlink control channel capable of being interpreted by the plurality of UEs in at least one of the one or more anchor subframes of the frame,
   wherein application of the changed configuration to one or more frames is a function of a location of reception of the common downlink control channel within the frame.

28. An apparatus of wireless communication by a User Equipment (UE), comprising:
   means for monitoring one or more anchor subframes of a frame for a common downlink control channel indicating a changed uplink/downlink configuration of subframes used for communication with at least the UE;
   means for decoding the common downlink control channel to determine the changed uplink/downlink configuration of subframes for use in subsequent communication; and
   means for determining one or more frames to apply the changed configuration as a function of a location of reception of the common downlink control channel within the frame.

* * * * *